United States Patent [19]

Hochstein et al.

[11] Patent Number: 4,922,718

[45] Date of Patent: May 8, 1990

[54] THERMAL ENERGY SCAVENGER

[75] Inventors: Peter A. Hochstein, Troy; William L. Pringle, Groose Pointe, both of Mich.

[73] Assignee: Armada Corporation, Detroit, Mich.

[21] Appl. No.: 419,454

[22] Filed: Oct. 10, 1989

[51] Int. Cl.⁵ .............................................. F03G 7/06
[52] U.S. Cl. ...................................................... 60/527
[58] Field of Search .......................... 60/527, 528, 529

[56] References Cited

U.S. PATENT DOCUMENTS

| | | | |
|---|---|---|---|
| 3,937,019 | 2/1976 | Renner | 60/527 |
| 4,197,708 | 4/1980 | Milton, Jr. et al. | 60/527 |
| 4,759,187 | 7/1988 | O'Hare | 60/527 |

*Primary Examiner*—Allen M. Ostrager
*Attorney, Agent, or Firm*—Reising, Ethington, Barnard, Perry & Milton

[57] ABSTRACT

A thermal energy scavenger assembly (10) includes a plurality of integral elements (12) made of temperature sensitive material having first and second ends (14, 16). The integral elements (12) comprise a first portion (18) which is subjected to predetermined cyclic temperature changes to cause the first portion (18) to undergo thermoelastic, martensitic phase transformations in response to heat to pass from a martensitic phase when at a temperature below a phase transformation temperature range and capable of a first high level of recoverable strain to an austenitic parent phase and a memory shape when at a temperature above the phase transformation temperature range and capable of a second lower level of recoverable strain. The integral elements (12) further include a second portion (20) which is integral with the first portion (18) but which is also incapable of the shape memory responses. The second (20) portion is not subjected to the predetermined cyclic temperature changes. Thus, the second portion (20) acts to limit the stress to which the first portion (18) is subjected as the first portion (18) of the temperature sensitive elements (12) is subjected to temperatures above the phase transformation temperature range and transformed from the martensitic phase to the austenitic parent phase.

19 Claims, 2 Drawing Sheets

THERMAL ENERGY SCAVENGER

BACKGROUND OF THE INVENTION

(1) TECHNICAL FIELD

This invention relates to a thermal energy scavenger or a thermal energy converting assembly of the type for converting heat energy into mechanical energy and, more specifically, to such an assembly utilizing a plurality of temperature sensitive elements made of a material which exhibits shape memory due to a thermoelastic martensitic phase transformations whereby less energy is required to strain the elements in a cold condition than the energy returned when the elements become unstrained as they are heated to a higher temperature.

(2) DESCRIPTION OF THE PRIOR ART

During recent years various materials comprising metal alloys have been developed which have a shape memory characteristic based upon thermoelastic, martensitic phase transformations which are stress or stain dependent. Basically, such alloys exhibit a stable shape in a phase above a given transformation temperature and experience a transformation to a martensitic phase at a temperature below the transformation temperature. The alloys have a much lower effective modulus in the martensitic phase below the transition temperature thereby requiring a relatively small amount of work in the form of stress and stain for straining the alloy when at the lower temperature. Further, the alloy provides much more work as it unstrains and returns to its original shape when it reaches a higher temperature above the transition temperature. Examples of alloys which have this shape memory characteristics are nickel-titanium; copper-aluminum-nickel; copper-zinc; iron-platinum and gold cadmium.

However, it should be noted that in order for the temperature sensitive elements made of the alloys as described above to have the shape memory characteristic, each element must be given a shape memory anneal. This heat treatment establishes the memory shape that the element will assume when heated above the phase transformation temperature. For example, the nickel titanium alloy exhibits excellent shape memory response when heat treated (memory annealed) at between 300° to 600° C. However, the unannealed, as drawn or as rolled state of the nickel titanium alloy, after careful repeated cold working, has yielded material with tensile yield strengths in excess of 200,000 psi with an elastic modulus of about $4 \times 10^6$ psi while still in the martensitic phase. Such material makes excellent springs, and in fact can store significantly more energy than steel because of the eight fold reduction in the modulus of elasticity with no sacrifice in yield strength.

A discussion of shape memory characteristics in a number of alloys is set forth in the *Journal of Material Science;* 1974, Volume 9, pages 15-21 by authors L. Delaey, R. V. Krishnan and H. Tas. Further discussions are set forth in *Metallurgical Transactions;* 1975, Volume 6A, page 29 by H. C. Tong and C. M. Wayman.

Further descriptions of materials having the shape memory characteristics are set forth in U.S. Pat. No. 3,174,851 granted Mar. 23, 1965 to William J. Buehler and Raymond C. Wiley and U.S. Pat. No. 3,558,369 granted to F. E. Wang and William J. Buehler on Jan. 26, 1971.

There have been efforts to utilize these materials, which have shape memory characteristics, in thermal energy converting assemblies and such assemblies have proven that the material may be so utilized. More specifically, there are various assemblies known in the prior art which utilize a thermal energy transfer between a fluid medium and a material which responds to thermal energy transfer to produce motion and work. Typically, the assemblies alternately subject the material to hot and cold fluids such as hot and cold water. In one such assembly, tubes of the temperature responsive material have alternate flows of hot and cold water through the tubes for resulting in an overworking of that portion of the tube forming the interface between the hot and cold as the tubes are heated from one end to the other. An example of this assembly is shown in U.S. Pat. No. 3,937,019 granted Feb. 10, 1976 to E. Renner. U.S. Pat. No. 4,041,706 granted Aug. 16, 1971 to F. I. White discloses a plurality of wire elements of thermally reactive material working together in a bundle with a rotating valve for alternately subjecting the wires to hot and cold liquid.

As this technology has developed, newer assemblies have been introduced into the prior art and have been directed at solving problems associated with the straining and unstraining of the temperature sensitive elements. For example, and more recently, U.S. Pat. No. 4,197,708 granted Apr. 15, 1980 to Milton, Jr. et al discloses a thermal energy scavenger which incorporates alternating stress limiters for limiting the stress applied to the temperature sensitive elements below a safe level in order to avoid plastically deforming the elements. This assembly includes a reaction mechanism which reacts with the elements for applying a stress to the elements to strain the elements during a first phase and for responding to the unstraining of the elements during a second phase. A carriage assembly supports the first and second ends of the elements for allowing the elements to be placed in tension while reacting with the reaction mechanism. The stress limiters are disposed between only one end of each of the elements and the carriage assembly for limiting the strain of the elements during the phases as stress is transmitted between the elements and the reaction mechanism through the stress limiters. The stress limiters as disclosed in the Milton Jr. et al patent includes a plurality of coiled springs which react between associated wire elements and the carriage assembly to limit the stress applied to the individual temperature sensitive elements below a predetermined level.

Unfortunately, a practical application of the above described stress limiters and as set forth in the '708 patent to Milton et al, could not be achieved for each of the very closely spaced individual wires in the bundle because of the use of the helical stress limiting springs.

Other problems relating to the transfer associated with the cyclic heating and cooling of temperature sensitive elements have been addressed in the prior art. For example U.S. Pat. No. 4,306,415 issued on Dec. 22, 1981 to Hochstein et al discloses a thermal energy scavenger employing a plurality of modular bundles of temperature sensitive elements made of nickel titanium alloy wire elements. With this design, it is important that the entire bundles of wires be quickly and efficiently cycled between the relatively hot and cold fluid environments so as to take advantage of the attendant phase transformation in the temperature sensitive elements while straining and unstraining the wire elements. To this end, the Hochstein et al '415 patent discloses a fluid flow control assembly calculated to subject the entire effective working length of the wire bundles across the width of the bundles to a flow of fluid flowing generally perpendicular to the length of and about the elements so that all portions of the length of each element are simultaneously subjected to the fluid. However, it is a practical reality that not all of the wires in the bundle will be subjected to the fluid flow simultaneously. Accordingly, the first wire is subjected to the fluid will undergo a phase transformation between austensite and martensite, and vice versa, before the phenomena can take place in the last wire subjected to the perpendicular fluid flow. When the entire modular bundle of wires is strained before all the wires in the bundle have been properly cooled to below the phase transformation temperature, this can result in the cold working of some of the lagging wires. Repeated cold working of the wires robs them of the ability to remember their shape after straining. The power output of the thermal energy scavenger is thereby reduced and the wires can ultimately break.

There have been other problems in the prior art assemblies associated with anchoring or fixedly supporting the temperature sensitive elements at their ends. Typically, the wire elements as employed in the prior art have been anchored by burying the material within a structure consisting of a clamp, screw or similar mechanism. See for example the Milton, Jr. et al '708 and the Hochstein et al '415 patents. Unfortunately, these anchoring systems have been relatively costly, difficult to produce, and have resulted in wire breakage.

The subject invention overcomes the deficiencies in the prior art in a more efficient, relatively simple thermal energy scavenger assembly which is capable of producing a higher energy density than those presently known in the prior art.

SUMMARY OF THE INVENTION AND ADVANTAGES

The subject invention is directed toward a thermal energy scavenger assembly which includes a plurality of integral elements made of temperature sensitive material having first and second ends and comprising a first portion which is subjected to predetermined cyclic temperature changes. These cyclic temperature changes cause the first portion to undergo thermoelastic, martensitic phase transformations in response to heat. During the temperature changes, the temperature sensitive material will pass from a martensitic phase when at a temperature below a phase transformation temperature range and capable of a first high level of recoverable strain to an austenitic parent phase and a memory shape when at a temperature above the phase transformation range and capable of a second lower level of recoverable strain. The temperature sensitive material also includes a second portion which is integral with the first portion but is incapable of shape memory responses. The second portion is not subjected to the predetermined cyclic temperature changes. The second portion is employed for limiting the stress to which the first portion is subjected as the first portion of the temperature sensitive elements is subjected to temperatures above the phase transformation temperature range and transformed from the martensitic phase to the austenitic parent phase. A hydrophobic barrier is mounted to a housing which encloses the first portion of the temperature sensitive elements and is disposed intermediate the first and second portions and includes means for allowing the elements to pass through the hydrophobic barrier while preventing a fluid used to induce the cyclic temperature changes from leaking from the housing.

Another feature is that the assembly includes element mounting means which support the elements at their first and second ends for allowing the elements to be strained during a first phase and unstrained during a second phase. The element mounting means includes a plurality of plates defining planes which are positioned parallel with respect to each other and disposed immediately adjacent one another. A plurality of temperature sensitive elements are disposed between the plurality of plates such that the elements are fixedly held between the plates.

The assembly further includes reaction means which react with the elements for applying a stress to the elements to strain the elements during a first phase and for responding to the unstraining of the elements during a second phase. The reaction means includes a strain limiting means for preventing the reaction means from applying stresses to the elements to strain the elements during the first phase until all of the elements have transformed to the martensitic phase when at a temperature below a phase transformation temperature range.

Accordingly, the subject invention overcomes the problems of the prior art by including a thermal energy scavenger which employs a plurality of integral elements having a first portion which undergoes the above mentioned phase transformation and from which work may be derived as this first portion is strained and unstrained and a second portion which is incapable of the above mentioned phase transformation but acts as a stress limiting mechanism because of its high yield strengths and relatively low elastic modulus. This feature is further facilitated by employing a hydrophobic barrier which is disposed between the first and second portions of the integral elements and includes means for allowing elements to pass through the barrier so that the first portion may be subjected to cyclic temperature changes via a fluid and which will prevent any leaking of the fluid from a housing which encloses a first portion of the elements.

The assembly's unique element mounting means facilitates the efficient, cost effective mounting of a plurality of temperature sensitive and elongated elements in such a fashion that the elements are not prone to breaking.

Finally, the thermal energy scavenger of the subject invention employs a strain limiting means wherein a plurality of the elements will not be strained until all of the elements have transformed to the martensitic phase when at a temperature below the phase transformation temperature range. In this way, the individual elements in a plurality or group of temperature sensitive elements will not be cold worked which can destroy the shape memory effect and thus the power out-put from the temperature sensitive elements.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
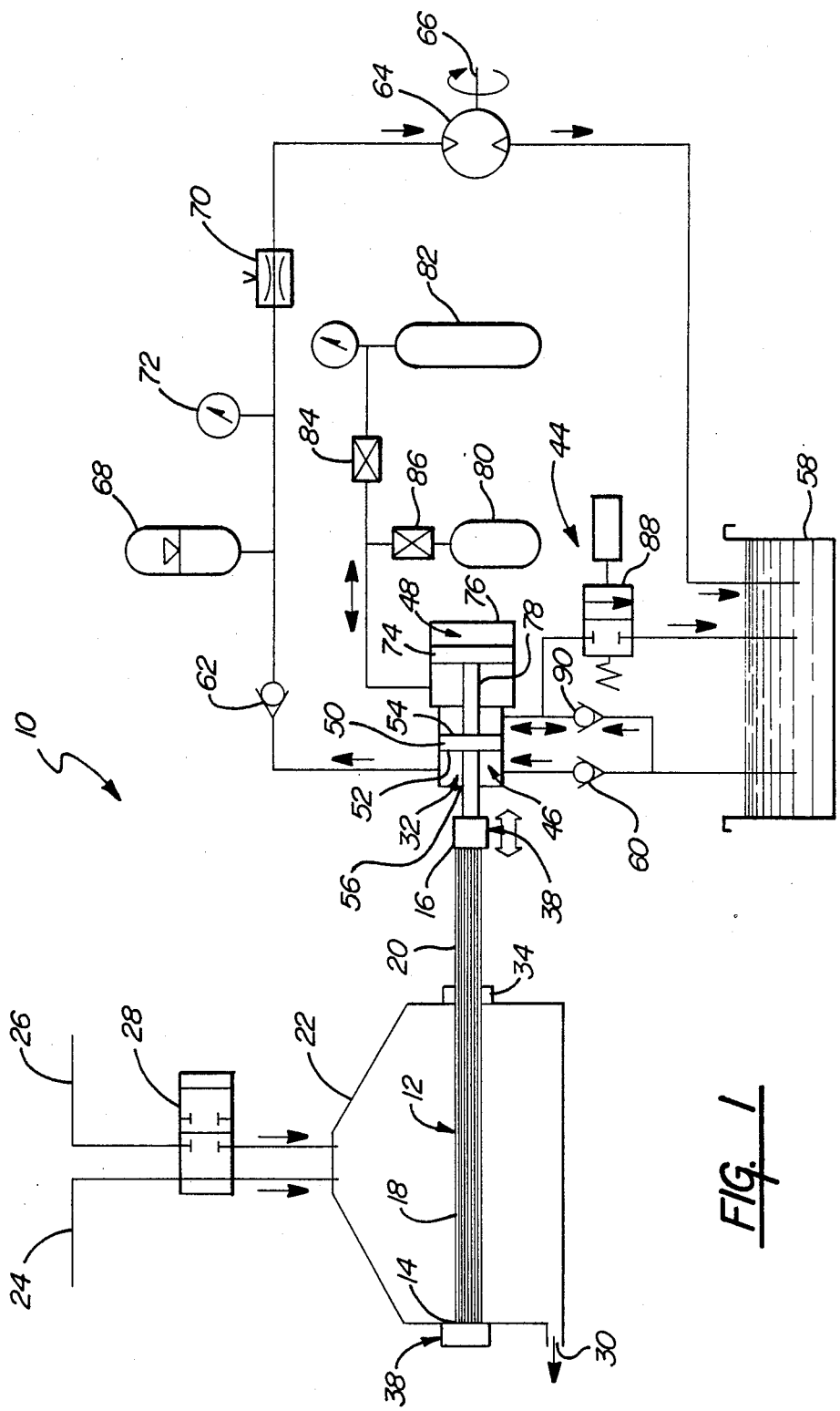
FIG. 1 is a schematic representation of the thermal energy scavenger assembly of the subject invention.

A thermal energy scavenger is generally shown at 10 in FIG. 1. The assembly 10 includes a plurality of integral elements generally indicated at 12 which are made of a temperature sensitive material having first and second ends 14, 16 respectively. The elements 12 comprise a first portion 18 which is subjected to predetermined cyclic temperature changes to cause the first portion 18 to undergo thermoelastic martensitic phase transformations in response to heat. In this way, the elements pass from a martensitic phase when at a temperature below a phase transformation temperature range and capable of a first high level of recoverable strain to an austenitic parent phase and a memory shape when at a temperature above the phase transformation temperature range and capable of a second lower level of recoverable strain. Obviously, a certain amount of stress will be attended in the element as they are strained. To this end, the elements 12 further include a second portion 20 which is integral with the first portion 18 but which is incapable of the shape memory responses. Further, the second portions 20 are not subjected to the predetermined cyclic temperature changes. More specifically, the second portions 20 of the elements 12 are employed for limiting the stress to which the first portion 18 is subjected as the first portions 18 of the temperature sensitive elements 12 are strained and subjected to temperatures above the phase transformation temperature range and transformed from the martensitic phase to the austenitic parent phase.

In the preferred embodiment of the subject invention, the temperature sensitive elements 12 are individual integral lengths of elongated wires including first and second portions 18 and 20. The first portion 18 of the temperature sensitive elements are made of a nickel-titanium alloy which is capable of thermoelastic, martensitic phase transformations in response to heat. The second portions 20 are also made of the nickel-titanium alloy but which have not been subjected to a shape memory anneal and thus are incapable of the thermoelastic martensitic phase transformation as described above. These second portions 20 of the elements 12 are made of cold worked, as-drawn nickel-titanium alloy which does not exhibit the shape memory characteristics. As alluded to above, the cold worked, as drawn, nickel-titanium alloy has excellent spring characteristics. This alloy is capable of ultimate tensil stresses in excess of 200 ksi and elastic strains in the order of 3%. Accordingly, the as-drawn nickel-titanium alloy forms a virtually ideal spring, primarily because of its unusually low elastic modulus. The thermal energy scavenger assembly 10 of the subject invention employs the superelastic properties of the unannealed cold worked, nickel-titanium alloy of the second portion 20 to protect the shape memory annealed material of the first portion 18 from being overstressed. Further, the stress limiting function is accomplished in an integral element 12.

The assembly 10 further includes a housing 22. The first portion 18 of the elements 12 are disposed within the housing 22 and the second portion 20 of the elements 12 extend out of the housing 22. The housing 22 includes a means for cycling a fluid through the housing 22 at predetermined temperatures to cause the first portion 18 of the elements 12 to undergo the aforementioned phase transformations in response to heat to pass from the martensitic phase to the parent austenitic phase as alluded to above. In the preferred embodiment of the subject invention, the fluid employed is typically water. The assembly includes a cold water supply 24 and a hot water supply 26. A valving system 28 is employed for controlling the ingress of the hot and cold water into the housing 22. An exhaust bore or port 30 is employed to drain the water from the housing in between cycles. The exhaust port 30 is typically disposed at a position generally opposite from the points of entry of the water into the housing. Accordingly, when the elements 12 have been cooled below the phase transformation temperature after being soaked in cold water, the elements 12 are strained and the cold water drained from the housing 22 through the exhaust port 30. The elements 12 are then soaked in the hot water which causes the elements 12 to pass from the martensitic phase back to the parent austenitic phase which further causes the elements 12 to "remember their original shape" and contract to the original length. The specific operation of the assembly 10 will be discussed in further detail below.

A reaction means, generally indicated at 32, is employed for reacting with the elements 12 for applying a stress to the elements 12 to strain the elements during a first phase while the elements are subjected to the cold water soak and for responding to the unstraining of the elements during a second phase and while the elements are subjected to the hot water soak.

The integral elements 12 are operatively connected to both the housing 22 and the reaction means 32. More specifically, the first end 14 of the elements 12 are fixedly attached at one end of the housing 22 remote from the reaction means 32. Further, the second end 16 of the elements 12 are fixedly attached to the reaction means 32 and remote from the housing 22.

Figure 2:
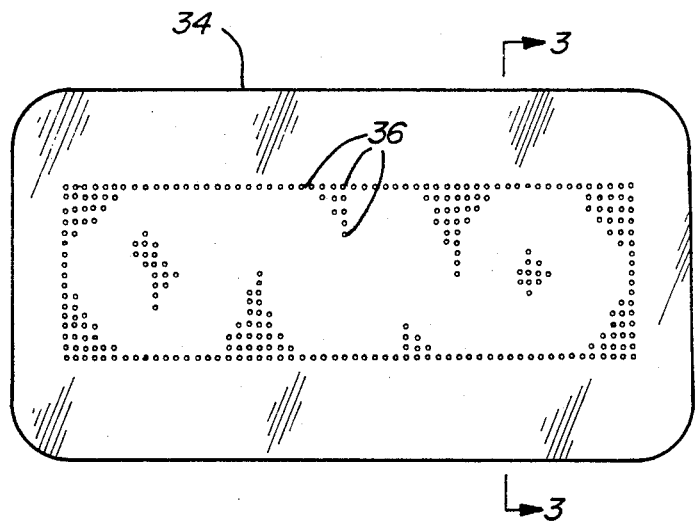
FIG. 2 is a side view of the hydrophobic barrier.
Figure 3:
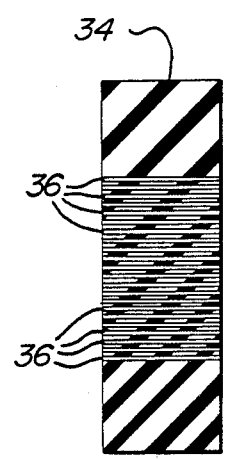
FIG. 3 is a cross-sectional side view taken substantially along lines 3—3 of FIG. 2.
Figure 4:
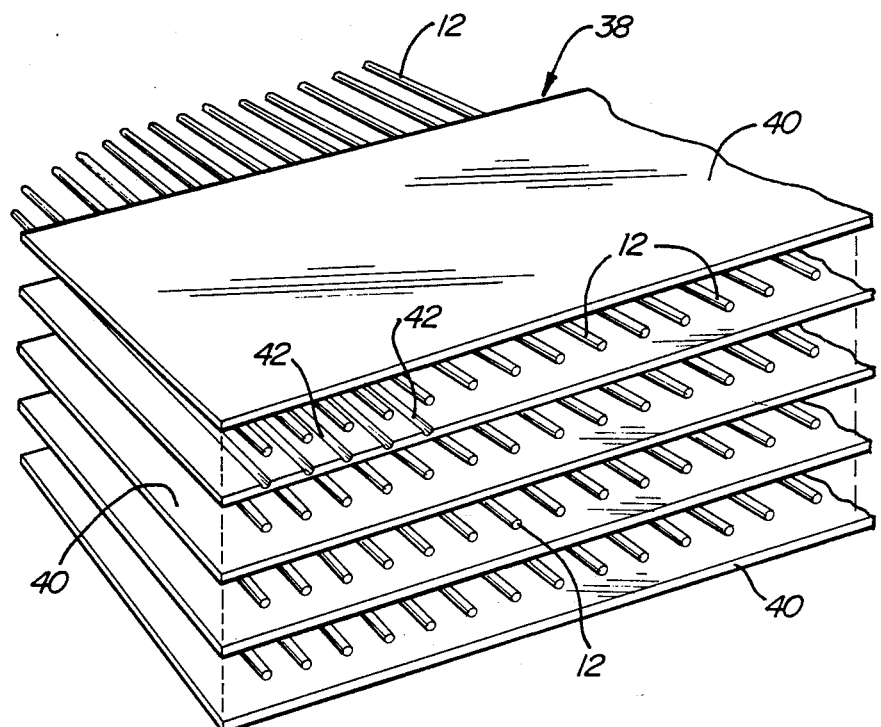
FIG. 4 is a perspective view of the element mounting means of the subject invention.

A hydrophobic barrier 34 is mounted to the housing 22 and is disposed between the first 18 and second 20 portions of the elements 12 intermediate of the fixed first and second ends 14, 16 respectively of the elements 12. As shown in FIGS. 2 and 3, the hydrophobic barrier 34 includes means 36 for allowing the wire elements to pass through the barrier 34 while preventing fluid from leaking from the housing 22. The means 36 for allowing the elements 12 to pass though the barrier 34 are apertures in the hydraphobic barriers 34. The apertures 36 closely conform around the temperature sensitive wire elements 12 to allow relative movement of the elements with respect to the barrier while preventing leakage of the fluid through the apertures. The barrier 34 may be made of any material which is hydrophobic in nature. For example, the hydrophobic barrier may be a Teflon (Reg. trademark of E.I. Dupont) shield which is disposed between the first and second portions 18 and 20 of the temperature sensitive elements 12 and at one end of the housing 22. Conversely, the hydrophobic barrier may be a molded silicone rubber shield which is similarly disposed as described above. The hydrophobic barrier shield is employed so that only the active shape memory annealed first portion 18 of the wire elements 12 is subjected to the cyclic heating and cooling. The barrier 34 makes it possible to operate the assembly 10 without having to heat and cool the second portion 20 of the wire elements 12. This feature also reduces wasteful parasitic losses. Further, the water is prevented from wetting the second portion 20 of the wire 12 which acts as a spring. By the use of Teflon or a molded silicone rubber, a very low coefficient of friction between the barrier and the nickel-titanium wire element 12, coupled with the relatively small movement (0.38 inches) of the wire 12 during stress and straining minimizes the energy losses due to friction. Additionally, the hydrophobic nature of the Teflon shield, for example, and the inherent lubricity of the water provide a surprisingly effective and trouble free seal.

The plurality of temperature sensitive wire elements 12 are disposed in parallel relationship with respect to each other. More specifically, the wire elements are disposed in a plurality of rows with the elements in each row closely spaced with respect to each other. The plurality of rows of wires 12 forms a matrix or bundle. Each bundle includes approximately 1000 wire elements 12 as shown in FIG. 1. However, although the assembly 10 as illustrated in FIG. 1 employs only one bundle of wires 12, it should be understood that the assembly 10 may be adapted to employ any number of wires disposed in a plurality of bundles.

The assembly 10 further includes element mounting means, generally indicated at 38, which support the elements 12 at its first and second ends 14, 16 for allowing the elements 12 to be strained during a first phase and unstrained during a second phase. The element mounting means 38 which support the first end 14 of the elements 12 is, in turn, securely mounted to the housing 22. Similarly, the element mounting means 38 which supports the second ends 16 of the elements 12 is securely mounted to the reaction means 32. The element mounting means 38 includes a plurality of plates 40 which define planes in parallel with respect to each other and which are disposed immediately adjacent one another. The wire elements 12 are disposed between the plurality of plates 40 such that the elements 12 are fixedly held between the plates 40. Said another way, the plurality of plates 40 include a series of plates which define the planes. The elongated elements are disposed in a plurality of rows as mentioned above with each row disposed between at least two plates 40 such that the elements 12 are fixedly held between the plates. The plates 40 may further include grooves 42 which are specifically adapted for receiving the individual wire elements. In any event, when the wire elements 12 are positioned between the series of plates 40 the plates are then sandwiched together which securely holds the wires 12 in place. Further, the plate 40 may be made of copper or any other deformable material which will form about the wire elements 12 to securely hold them in place.

As mentioned above, the reaction means 32 reacts with the elements 12 for applying a stress to the elements to strain the elements during the first phase and for responding to the unstraining of the elements during a second phase. The reaction means 32 includes a strain limiting means, generally indicated at 44, for preventing the reaction means 32 from applying the stress to the elements 12 to strain the wire elements 12 during the first phase until all of the elements have transformed to the martensitic phase when the elements 12 are at a temperature below a phase transformation temperature. This feature is important because straining the elements before all the elements have undergone the phase transformation will cause degeneration of the active nitinol wires and will ultimately result in lower power output and wire breakage.

The reaction means 32 also includes a hydraulic pump means, generally indicated at 46, which is operatively connected to the element mounting means 38 which mounts the second end 16 of the elongated elements 12. The hydraulic pump means 46 is capable of moving between first and second positions and responds to the unstraining of the elements during a second phase to pump a fluid. The reaction means 32 further includes a straining means, generally indicated at 48, which is operatively connected to the hydraulic pump means 46 to strain the elements 12 as the hydraulic pump means 46 is moved from its first to its second positions. The strain limiting means 44 locks the straining means 48 from moving the hydraulic pump means 46 from it first to its second positions during the first phase until all the elements have transformed to the martensitic phase.

The hydraulic pump means 46 includes piston 50 having first and second sides 52, 54 respectively and which is disposed within a cylinder 56. The piston 50 is operatively connected on its first side 52 to the element mounting means 38 which operatively supports the second end 16 of the wire elements 12. The piston 50 is also operatively connected on its second side 54 to the straining means 48. When the piston 50 moves between its first and second positions as its responds to the straining and unstraining of the elements, the pump 46 pumps fluid from a reservoir 58 past check valves 60 and 62 and ultimately drives a fluid motor 64 as illustrated in FIG. 1. The fluid motor 64, in turn, drives an output shaft 66 from which power may be derived. A hydraulic accumulator 68 is disposed between the pump 46 and the fluid motor 64 and is employed to transform the pulsed fluid delivered from the hydraulic pump 46 to an even flow. A flow control valve 70 may be employed for controlling the flow of the fluid to the fluid motor 60. To this end, a hydraulic pressure gauge 72 may be used to control the flow of the fluid at the fluid motor 60.

The straining means 48 includes a piston 74 disposed within a cylinder 76 and a rod 78 which extends from the piston 74 and is operatively connected to the second side 54 of the piston 50 of the hydraulic pump 46. The piston 74 of the staining means 48 is movable between first and second positions to move the piston 50 of the hydraulic pump 46 from its first to its second position to strain the elements 12. The straining means 48 is essentially a gas spring which moves the piston 50 of the hydraulic pump 46 in response to pressure derived from an air surge tank 80. The air surge tank 80 is initially charged from an air supply tank 82 by electronically opening the valves 84 and 86. Once the air surge tank 80 is fully charged, the valve 84 may be closed. The valve 86 may then be opened and closed depending on whether pressure is needed to move the piston 74 of the straining means from the first to the second position or vice versa.

The strain limiting means 44 includes a load interrupter valve 88 for regulating the flow of fluid to one side of the piston 50 disposed in the cylinder 56 of the hydraulic pump means 46. The load interrupter valve 88 locks the piston 50 from moving from its first to its second positions under the influence of a force supplied by the straining means 48 to strain the elements 12 during the first phase until all of the elements have transformed to the martensitic phase. More specifically, the load interrupter valve 88 is a solenoid operated valve system which communicates fluid from a hydraulic reservoir 58 through a check valve 90 into the cylinder 56 of the hydraulic pump 46 to act on the second side 54 of the piston 50 to prevent the piston from moving to its second position. A control system (not shown) comprising adjustable reset timers controls the load interrupter valve 88 so that the piston 50 is locked for a time period sufficient for all the nickel-titanium alloy wires 12 in the bundle to be cooled to a fully martensitic condition. When all the wires in the bundle have reached this phase the fluid is drained from the cylinder 56 through the load interrupter valve 88 and back to the reservoir 58. The piston 50 is then free to move within the cylinder 56 to its second position under the force supplied by the pressure acting on the piston 74 of the straining means 48. In this way the fully martensitic wire elements 12 may be strained without degenerating the shape memory effect of the first portion 18 of the elements 12.

In its operative mode, the thermal energy scavenger assembly 10 of the subject invention operates as follows: A cool fluid, typically water, is introduced into the housing 22 from a cold water supply 24 to cool the shape memory annealed first portions 18 of the elements below a phase transformation temperature so that they transform from a parent austenitic phase to a martensitic phase. At the martensitic phase, the annealed shape memory first portions 18 are capable of a high level of recoverable strain. However, at substantially the same time, the solenoid operated load interrupter valve 88 of the strain limiting means 44 is actuated to deliver fluid into the cylinder 56 of the hydraulic pump 46 on the second side 54 of the piston 50. This prevents the piston 50 from moving from its first position to its second position under the force being applied by the gas spring of the straining means 48. Once all of the wires have reached the martensitic phase, a condition which is determined by careful setting of the adjustable reset timers in accordance with known parameters of the particular nickel-titanium alloy as set forth in publications available in the prior art and other factors such as the temperature of the hot and cold media, the load interrupter valve 88 is reversed and the fluid drained from the cylinder 56 back into the reservoir 58. At this point, the entire bundle of wires 12 may be strained under the force of the pressure acting on the piston 74 of the straining means 48. The cold water is then drained from the housing 22 through the exhaust port 30. After the elements 12 have been strained a predetermined amount, a hot fluid, typically water, is introduced into the housing 22 from a hot water supply 26 to heat the elements 12 above the predetermined phase transformation temperature. When this occurs, the wire elements 12 again undergo a phase transformation from martensite to austenite. In their austenitic phase, the elements are not capable of the same level of recoverable strain that they were in the martensitic phase. However, they are now capable of sustaining a much higher level of stress. Further, the elements "remember" their original unstrained shape before being immersed in the cold water. Consequently, the pressure acting on the piston 74 of the straining means 48 is relieved from the cylinder 76 by electronic activation of the valve 86 and the elements 12 quickly contract to their original length they had prior to straining. This contracting action acts on the piston 50 of the hydraulic pump 46 to move the piston 50 from its second to its first position. Repeated heating and cooling of the wire elements 12 cause a pumping action by the piston 50 to pump the fluid and ultimately drive the fluid motor 60.

As alluded to above, during the contracting action as the elements return to their parent austenitic phase, they are often subjected to very high levels of stress. In order to ensure that the annealed shape memory first portions 18 of the elements 12 will not break, the assembly 10 includes a second portion 20 comprising unannealed, as drawn nickel-titanium which does not undergo the shape memory phase transformations but which acts as a spring to limit the stress to which the first portion 18 is subjected.

The assembly 10 of the subject invention has been specifically designed to ensure the long life of the nickel-titanium alloy wire elements in a cost effective efficient system which is capable of generating a respectable level of power output.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that within the scope of the appended claims wherein reference numerals are merely for convenience and are not to be in any way limiting, the invention may be practiced otherwise than as specifically described.

What is claimed is:

1. A thermal energy scavenger assembly (10) comprising:
   a plurality of integral elements (12) made of temperature sensitive material having first and second ends (14, 16) and comprising a first portion (18) which is subjected to predetermined cyclic temperature changes to cause said first portion (18) to undergo thermoelastic, martensitic phase transformations in response to heat to pass from a martensitic phase when at a temperature below a phase transformation temperature range and capable of a first high level of recoverable strain to an austenitic parent phase and a memory shape when at a temperature above the phase transformation temperature range and capable of a second lower level of recoverable strain;
   and a second portion (20), integral with said first portion (18) and incapable of shape memory responses, said assembly is characterized by said second portion (20) not being subjected to said predetermined cyclic temperature changes for limiting the stress to which said first portion (28) is subjected as said first portion (18) of said temperature sensitive elements (12) is subjected to temperatures above the phase transformation temperature range and transformed from the martensitic phase to the austenitic parent phase.

2. An assembly (10) as set forth in claim 1 further characterized by including a housing (22), said first portion (18) of said elements (12) disposed within said housing (22) and said second portion (20) of said elements extending out of said housing (22).

3. An assembly (10) as set forth in claim 2 further characterized by including a reaction means (32) reacting with said elements (12) for applying a stress to said elements (12) to strain said elements (12) during a first phase and for responding to the unstraining of said elements (12) during a second phase.

4. An assembly (10) as set forth in claim 3 further characterized by said first end (14) of said elements (12)

fixedly attached at one end of said housing (22) remote from said reaction means (32);
  said second end (16) of said elements (12) fixedly attached near said reaction means (32) and remote from said housing (12).

5. An assembly (10) as set forth in claim 4 further characterized by said housing (22) including means (28) for cycling a fluid through said housing (22) at predetermined temperatures to cause said first portion (18) of said elements to undergo a thermoelastic, martensitic phase transformation in response to heat to pass from a martensitic phase when at a temperature below a phase transformation temperature range and capable of a first high level of recoverable strain to an austenitic parent phase and a memory shape when at a temperature above the phase transformation temperature range and capable of a second lower level of recoverable strain.

6. An assembly (10) as set forth in claim 5 further characterized by including a hydraphobic barrier (34) mounted to said housing and disposed between said first (18) and second (20) portions of said elements (12), intermediate of said fixed first (14) and second (16) ends of said first (18) and second (20) portions and including means (36) for allowing said elements (12) to pass through said barrier (34) while preventing fluid from leaking from said housing (22).

7. An assembly (10) as set forth in claim 6 further characterized by said temperature sensitive elements (12) being an integral length of elongated wire including said first (18) and second portions (20);
  said means for allowing said elements to pass through said barrier being apertures (36) in said hydraphobic barrier (34) conforming closely around said temperature sensitive wire elements (12) to allow relative movement of said elements (12) with respect to said barrier (34) while preventing leakage of said fluid through said apertures (36).

8. An assembly (10) as set forth in claim 7 further characterized by said first portion (18) of said wire element (12) being a nickel titanium alloy which is capable of a thermoelastic, martensitic phase transformation in response to heat and said second portion (20) of said wire element being made of cold worked, as drawn nickel titanium alloy which is incapable of said phase transformation.

9. An assembly (10) as set forth in claim 6 further characterized by said hydraphobic barrier (34) being a teflon shield disposed between said first (18) and second (20) portions of said temperature sensitive elements (12) and at one end of said housing (22).

10. An assembly (10) as set forth in claim 6 further characterized by said hydraphobic barrier (34) being a molded silicon rubber shield disposed between said first (18) and second (20) portions of said temperature sensitive elements (12) and at one end of said housing (22).

11. A thermal energy scavenger assembly (10) comprising:
  a plurality of temperature sensitive elements (12);
  said elements (12) being elongated with first (14) and second (16) ends and disposed in parallel relationship with respect to each other, said assembly including element mounting means (38) supporting said elements (12) at said first (14) and second (16) ends for allowing said elements (12) to be strained during a first phase and unstrained during a second phase;
  and characterized by said element mounting means (38) including a plurality of plates (40) defining planes in parallel with respect to each other and disposed immediately adjacent one another, said plurality of elements (12) disposed between said plurality of plates (40) such that said elements (12) are fixedly held between said plates (40).

12. An assembly (10) as set forth in claim 11 further characterized by said plurality of plates (40) including a series of plates (40) defining planes disposed in parallel with respect to each other and disposed immediately adjacent to one another;
  said plurality of elongated elements (12) disposed in a plurality of rows with each row disposed between at least two plates (40) such that said elements (12) are fixedly held between said plates (40).

13. An assembly (10) as set forth in claim 12 further characterized by said plurality of temperature sensitive elements (12) comprising a first portion (18) which undergoes a thermoelastic martensitic phase transformation in response to heat to pass from a martensitic phase when at a temperature below a phase transformation temperature range and capable of a first high level of recoverable strain to an austenitic parent phase and a memory shape when at a temperature above the phase transformation temperature range and capable of a second lower level of recoverable strain,
  and a second portion (20) integral with said first portion (18) and incapable of shape memory response when heated from below the phase transformation temperature range to a temperature above the phase transformation temperature range.

14. An assembly (10) as set forth in claim 13 further characterized by said elements (12) being wires made of a nickel titanium alloy and said plates (40) being made of copper, said cooper plates (40) forming around said wire nickel titanium elements (12) to fixedly hold said elements (12) between said plates (40).

15. A thermal energy scavenger assembly (10) comprising:
  a plurality of temperature sensitive elements (12) made of material which exhibit shape memory and which undergoes a thermoelastic, martensitic phase transformation in response to heat to pass from a first martensitic phase when at a temperature below a phase transformation temperature range and capable of a first high level of recoverable strain to a parent austenitic phase and a memory shape when at a temperature above the phase transformation temperature range and capable of a second lower level of recoverable strain;
  said elements (12) being elongated with first and second ends (14, 16);
  reaction means (32) reacting with said elements (12) for applying a stress to said elements (12) to strain said elements (12) during said first phase and for responding to the unstraining of said elements (12) during said second phase;
  said assembly (10) characterized by said reaction means (32) including a strain limiting means (44) for preventing said reaction means (32) from applying stress to said elements (12) to strain said elements (12) during said first phase until all of said elements (12) have transformed to said martensitic phase when at a temperature below a phase transformation temperature range.

16. An assembly (10) as set forth in claim 15 further characterized by said reaction means (32) including a hydraulic pump means (46) operatively connected to said second end (16) of said elongated elements (12) and capable of moving between first and second positions for responding to the unstraining of said elements (12) during said second phase to pump a fluid;

and a straining means (48) operatively connected to said hydraulic pump means (46) to strain said elements (12) as said hydraulic pump means (46) is moved from said first to said second positions;

said strain limiting means (44) locking said straining means (48) from moving said hydraulic pump means (46) from said first to said second position to strain said elements (12) during said first phase until all of said elements (12) have transformed to said martensitic phase when at a temperature below a phase transformation temperature range.

17. An assembly (10) as set forth in claim 16, further characterized by said hydraulic pump means (46) including a piston (50) having first (52) and second (54) sides disposed within a cylinder (56) and operatively connected on said first side (52) to said second end (16) of said elements (12) for responding to the unstraining of said elements (12) during said second phase to pump a fluid;

and operatively connected on said second side (54) to said straining means (48) for straining said elements (12) as said hydraulic pump means (46) is moved from said first to said second position.

18. An assembly (10) as set forth in claim 17, further characterized by said straining means (48) including a piston (74) disposed within a cylinder (76) and a rod (78) extending from said piston (74) and operatively connected on said second side (54) of said piston (50) of said hydraulic pump means (46);

said piston (74) of said straining means (48) movable between first and second position to move said piston (50) of said hydraulic pump means (46) from said first to said second position to strain said elements (12).

19. An assembly (10) as set forth in claim 18, further characterized by said strain limiting means (44) including a load interrupter valve (88) for regulating the flow of fluid to one side of said piston (50) disposed in said cylinder (56) of said hydraulic pump means (16) for locking said piston (50) from moving from said first to said second position to strain said elements (12) during said first phase until all of said elements (12) have transformed to said martensitic phase when at a temperature below a phase transformation temperature.

* * * * *